(12) United States Patent
Dadda et al.

(10) Patent No.: US 11,814,693 B2
(45) Date of Patent: Nov. 14, 2023

(54) HIGH STRENGTH STEEL TUBE AND METHOD OF MANUFACTURING A HIGH STRENGTH STEEL TUBE

(71) Applicant: Benteler Steel/Tube GmbH, Paderborn (DE)

(72) Inventors: Jayaram Dadda, Paderborn (DE); Leonhard Rose, Paderborn (DE); Matthias Ritter, Paderborn (DE); Farzad Foadian, Paderborn (DE)

(73) Assignee: Benteler Steel/Tube GmbH

( * ) Notice: Subject to any disclaimer, the term of this patent is extended or adjusted under 35 U.S.C. 154(b) by 0 days.

(21) Appl. No.: 17/550,781

(22) Filed: Dec. 14, 2021

(65) Prior Publication Data
US 2022/0195551 A1 Jun. 23, 2022

(30) Foreign Application Priority Data
Dec. 16, 2020 (DE) .................. 10 2020 133 765.5

(51) Int. Cl.
| | |
|---|---|
| C21D 9/08 | (2006.01) |
| C22C 38/50 | (2006.01) |
| C22C 38/46 | (2006.01) |
| C22C 38/44 | (2006.01) |
| C22C 38/48 | (2006.01) |
| C22C 38/06 | (2006.01) |
| C22C 38/04 | (2006.01) |
| C22C 38/02 | (2006.01) |
| C21D 6/00 | (2006.01) |
| C21D 1/42 | (2006.01) |
| C21D 1/18 | (2006.01) |
| C21D 1/30 | (2006.01) |

(52) U.S. Cl.
CPC .............. *C21D 9/085* (2013.01); *C21D 1/18* (2013.01); *C21D 1/42* (2013.01); *C21D 6/004* (2013.01); *C21D 6/005* (2013.01); *C21D 6/008* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C21D 1/30* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 2003/0155052 A1* | 8/2003 | Kondo | ................. C22C 38/22 148/593 |
| 2006/0070687 A1 | 4/2006 | Miyata et al. | |
| 2012/0205016 A1 | 8/2012 | Arai et al. | |

FOREIGN PATENT DOCUMENTS

| | | | |
|---|---|---|---|
| FR | 2 999 607 | | 6/2014 |
| JP | 0452226 A | * | 2/1992 |
| JP | 2 705 284 | | 1/1998 |
| WO | WO 2007/113642 | | 10/2007 |

* cited by examiner

*Primary Examiner* — Anthony M Liang
(74) *Attorney, Agent, or Firm* — Pandiscio & Pandiscio

(57) ABSTRACT

The present invention relates to a high strength steel tube. In addition, the invention relates to a method of manufacturing a high strength steel tube. The method is characterized in that a hot rolled pre-tube is subjected to at least two hardening steps with a final tempering step, the pre-tube is heated to a quenching temperature of at least Ac3 temperature for hardening and is heated to a tempering temperature in the range of 400 to 600° C. for tempering.

27 Claims, 4 Drawing Sheets

HIGH STRENGTH STEEL TUBE AND METHOD OF MANUFACTURING A HIGH STRENGTH STEEL TUBE

FIELD OF THE INVENTION

The present invention relates to a high strength steel tube and a method of manufacturing a high strength steel tube.

BACKGROUND OF THE INVENTION

For many applications of tubes or tube products made from them, it is necessary that they are of high-strength and yet have sufficient toughness. These requirements are particularly high for applications as airbag tubes.

In the manufacture of steel tubes, it is known to subject a pre-tube, in particular a hot-rolled pre-tube, also referred to as a hollow or bloom, to a heat treatment. In particular, it is known to subject a hollow to a hardening step followed by a tempering step. A disadvantage of this heat treatment is that the grain size of the austenite grain present before quenching and the average martensite package size is large. As a result, the yield strength of the steel pipe is low, which is disadvantageous for the relevant applications.

SUMMARY OF THE INVENTION

It is therefore an object of the present invention to provide a steel tube which meets the requirements of the particular application.

According to one aspect, this task is solved by a method for manufacturing a high-strength steel tube. The method is characterized in that a hot rolled pre-tube is subjected to at least two hardening steps with a final tempering step, the pre-tube is heated to a quenching temperature greater than the Ac3 temperature for hardening and is heated to a tempering temperature in the range of 400 to 600° C. for tempering.

The steel tube will hereinafter also be referred to as steel pipe.

A high-strength steel tube is a steel tube having a high tensile strength Rm of at least 900 MPa, preferably a tensile strength of at least 1,050 MPa. The hot-rolled pre-tube from which the steel tube is made is also referred to as a hollow or bloom. Preferably, at least heat treatment of the pre-tube is necessary to produce the steel tube from the pre-tube.

According to one embodiment, the heat treatment comprises at least two hardening steps with a final tempering step. The hardening step is defined as hardening by means of heating or heating-up to a quenching temperature, holding at the quenching temperature and quenching. Preferably, quenching is performed to a temperature below the martensite starting temperature (Ms).

In one embodiment, the final hardening step is followed by a tempering step. In the tempering step, the quenched pre-tube is heated to a tempering temperature, held at this tempering temperature and cooled down from this temperature.

Preferably, in one embodiment of the method, two hardening steps are performed. Carrying out two hardening steps with a single tempering step following the second hardening step is also referred to hereinafter as double quenching and tempering (DQ&T).

Preferably, each hardening step comprises heating to a quenching temperature, holding at the quenching temperature, and quenching. Preferably, the quenching temperature is above the Ac3 temperature so that heating and holding at the quenching temperature results in austenitizing of the steel. Each austenitizing step is followed by a quenching step.

Quenching is the term used to describe cooling at a high cooling rate. In particular, quenching thus differs from cooling methods such as air cooling. Moreover, in the quenching according to the invention, the pre-tube is preferably quenched in such a way that the steel over the complete wall thickness of the pre-tube is reduced to the desired temperature. The desired temperature is therein a temperature at which austenite is converted into martensite. In particular, this can be the so-called martensite start temperature Ms, but preferably the martensite finish temperature Mf of the steel alloy at which austenite has been largely or completely converted into martensite. This is, for example, a temperature below 300° C. However, the pre-tube can also be quenched to approximately room temperature or cooled further at a slower rate after quenching for martensite transformation.

Moreover, the at least two hardening steps according to the invention take place after the hot rolling. In the hardening steps themselves, no further forming of the pre-tube is carried out.

According to one embodiment, in the hardening step, i.e. for hardening, the pre-tube is heated to a quenching temperature greater than the Ac3 temperature. The Ac3 temperature denotes the temperature at which the material, i.e. the steel of the pre-tube, has been austenitized.

In the tempering step, the pre-tube is heated to a tempering temperature, preferably in the range of 400 to 600° C. Preferably, the tempering temperature is in a range of 400-500° C. Particularly preferably, the tempering temperature in this range is above 400° C.

According to a preferred embodiment, by subjecting the pre-tube to multiple, in particular double, quenching and tempering (DQ&T), a very fine-grained microstructure is set in the pre-tube. In particular, a significantly higher grain refinement, i.e. smaller grain size is obtained compared to a pre-tube treated only by single hardening followed by tempering. In particular, a substantially smaller average austenite grain size of the austenite grain present before quenching is obtained. This austenite grain size is also referred to as the original or former average austenite grain size ($D_{avg}$). In addition, the yield strength of the material of the steel tube is increased and the toughness of the material of the steel tube is increased. This results in particular from the increase in breaking strength and the stopping of crack propagation through the grain boundaries, which results in particular from the smaller martensitic package size ($d_{avg}$).

According to one embodiment, the pre-tube is heated to a temperature of Ac3+50° C. for hardening. This ensures complete austenitization of the material of the pre-tube.

According to a preferred embodiment, the pre-tube is drawn after the tempering step. In particular, the pre-tube is subjected to at least one cold drawing step after the tempering step. By this embodiment, a steel pipe with a small wall thickness and yet the properties adjusted by the heat treatment, in particular a high tensile strength, high yield strength and at the same time high toughness, in particular low-temperature toughness, can be produced. In this embodiment, the steel tube produced by the process can be used in particular as an airbag tube.

According to one embodiment, stress relief annealing is performed on a pre-tube that is cold drawn after tempering.

According to a preferred embodiment, heating is performed by induction heating. A high heating rate can be achieved by induction heating.

According to a preferred embodiment, heating to the quenching temperature is performed at a heating rate greater than 50K/s, preferably greater than 70K/s, for example at 200 K/s.

According to a preferred embodiment, quenching is performed at a t8/5 time of less than 4 s. The t8/5 time is the time required for cooling from 800° C. to 500° C.

According to one embodiment, the pre-tube is maintained at the quenching temperature for a period of 1 to 10, for example 3 to 6 seconds, prior to quenching.

According to one embodiment, the pre-tube is maintained at the tempering temperature for a period of time greater than 5 seconds.

According to a further aspect, the problem is solved by a high-strength airbag tube characterized in that the steel tube has a martensitic structure with a microstructure having a former average austenite grain size ($D_{avg}$) of <5 μm and has a tensile strength of at least 900 MPa, preferably at least 1,050 MPa, and a transition temperature of at most −60° C. (minus 60° C.). The airbag tube is also referred to hereinafter as a steel tube.

Preferably, the former average austenite grain size ($D_{avg}$) is <4.6 μm, in particular <4.0 μm, more preferably <3.5 μm.

The transition temperature, also referred to as the Ductile-to-Brittle Transition Temperature (DBTT), defines the temperature at which the toughness properties transition from a high energy level, which can be simply referred to as the high level, to a low energy level, which can be simply referred to as the low level. On cooling below the transition temperature, there is a sharp drop in impact energy and hence brittle fracture. The transition temperature can be determined in a ring-Charpy test, in which an annular section is cut from the finished steel tube, e.g. gas generator tube, provided with a defined notch and then tested in a pendulum impact device. In particular, the steel tube exhibits ductile behavior even down to −60° C. The Charpy impact strength is preferably measured according to the Japanese Standards Association (JSA) standard JIS Z 2242 corresponding to ISO 179.

According to a further aspect, the problem is solved by a high-strength steel tube characterized in that it is produced according to the process according to the invention. In one embodiment, the steel tube produced according to the process according to the invention has a microstructure with a former average austenite grain size ($D_{avg}$) of <5 μm and has a tensile strength of at least 900 MPa and a transition temperature of at most −60° C. The steel tube preferably represents an airbag tube.

Advantages and features described with respect to the process apply—as far as applicable—also to the steel tubes according to the invention according to claim 1 and claim 2, and vice versa. Moreover, advantages and features described with respect to the steel pipe according to claim 1 also apply—as far as applicable—to the steel tube produced according to the process according to the invention and vice versa.

According to a preferred embodiment, the steel tube has a martensitic structure.

According to one embodiment, the steel tube consists of an alloy having the following alloying elements in Ma-% (mass percent), in addition to iron and impurities due to melting:

C 0.07-0.50
Si 0.01-0.60
Mn 0.3-1.7
Cr max. 1.2
Momax. 1.2
Ni max. 0.4
Al 0.01-0.10
V max. 0.15
Nb max. 0.06
Ti max. 0.06.

The alloy is also referred to as steel alloy, steel or material in the following. Contents of alloying elements are given in percent by mass, but are designated simply by percent where appropriate.

Carbon (C) is preferably present in an amount in the range of 0.07-0.50 Ma %. Carbon increases the strength of the steel alloy.

Silicon (Si) is preferably present in an amount in the range of 0.01-0.60 Ma %, preferably in the range of 0.01-0.50 Ma %. Silicon increases the tensile strength and yield strength.

Manganese (Mn) is preferably present in an amount in the range of 0.3-1.7 Ma %. Manganese increases the yield strength and strength of the steel alloy. In addition, manganese improves weldability as a substitute for carbon. According to a preferred embodiment, manganese is present in an amount in the range of 0.5-1.7 Ma % and more preferably in the range of 0.6-1.7 Ma %.

Chromium (Cr) is preferably present in an amount not exceeding 1.2 Ma %. Chromium increases the toughness and tensile strength of the steel alloy.

Molybdenum (Mo) is preferably present in an amount not exceeding 1.2 Ma %. Molybdenum improves in particular the tensile strength and weldability of the steel alloy.

Nickel (Ni) is preferably present in an amount not exceeding 0.4 Ma %. Nickel increases the tensile strength and yield strength.

Aluminium (Al) is preferably present in an amount in the range of 0.01-0.10 Ma %.

Vanadium (V) is preferably present in an amount not exceeding 0.15 Ma %. Vanadium increases the tensile strength of the alloy.

Niobium (Nb) is preferably present in an amount not exceeding 0.06 Ma %.

Titanium (Ti) is preferably present in an amount not exceeding 0.06 Ma %.

Melt-related or melting-related impurities are, in particular, impurities which enter the steel alloy during steel production, in particular as a result of materials added during the production of the melts and treatment of the melt.

In one embodiment, the steel tube according to the invention consists of a steel alloy, which can be used in particular for the process according to the invention, of the following alloying elements present in Ma % in the alloy, apart from iron and impurities due to melting:

C 0.08-0.15
Si 0.01-0.60
Mn 1.0-1.7
Cr max. 1.0; preferably 0.2-0.9
Mo max. 0.2
Ni max. 0.4; preferably 0.15-0.4
Al 0.01-0.10
V max. 0.15
Nb max. 0.06
Ti max. 0.06.

The steel tube is in particular an airbag tube. According to a preferred embodiment, the steel tube has a microstructure with an average original austenite grain size ($D_{avg}$) of <5 micrometers (μm), preferably 4.6 μm, in particular <4.0 μm, more preferably <3.5 μm.

According to a preferred embodiment, the steel tube, in particular the airbag tube, has a microstructure with an average martensitic package size of $d_{avg}$<3 μm.

According to one embodiment, the steel tube, in particular the airbag tube, has a microstructure of stretched, tempered martensite. This microstructure is preferably achieved in particular by a heat treatment followed by cold drawing.

Preferably, the airbag tube has a transition temperature of less than −60° C. The transition temperature is preferably determined by the above-mentioned ring-Charpy test. For example, the transition temperature is determined by taking a sample in the respective length section as an annular notched impact sample, i.e. as a narrow tube section with a predetermined notch introduced for test purposes. After cooling to the low-temperature condition of the sample, an axial impact is applied to the sample. The transition temperature is the temperature at which the specimen changes from plastic to brittle fracture behaviour. It is understood that to determine this, several samples must be tested for the characterization of a length section.

According to one embodiment, the steel tube, in particular the airbag tube, has a wall thickness of less than 4 millimeters (mm). Steel tubes with this wall thickness are used in particular as airbag tubes.

Preferably, the steel tube has a reduced tolerance band, in particular half "values" of the EN 10305-1 standard, for the outside diameter (AD) and/or for the inside diameter (ID) compared to a finish-treated steel tube.

Preferably, the steel tube is free of scale, as opposed to a finish-treated steel tube that has not been post-treated.

Preferably, in the case of an airbag tube, a drawing step, in particular a cold drawing step, is carried out during manufacture after heat treatment. Particularly preferably, a stress relief annealing step is performed after the drawing step.

BRIEF DESCRIPTION OF THE DRAWINGS

The invention will be explained in more detail by the following description of the figures. Showing.

DETAILED DESCRIPTION OF THE PREFERRED EMBODIMENTS

Figure 1:
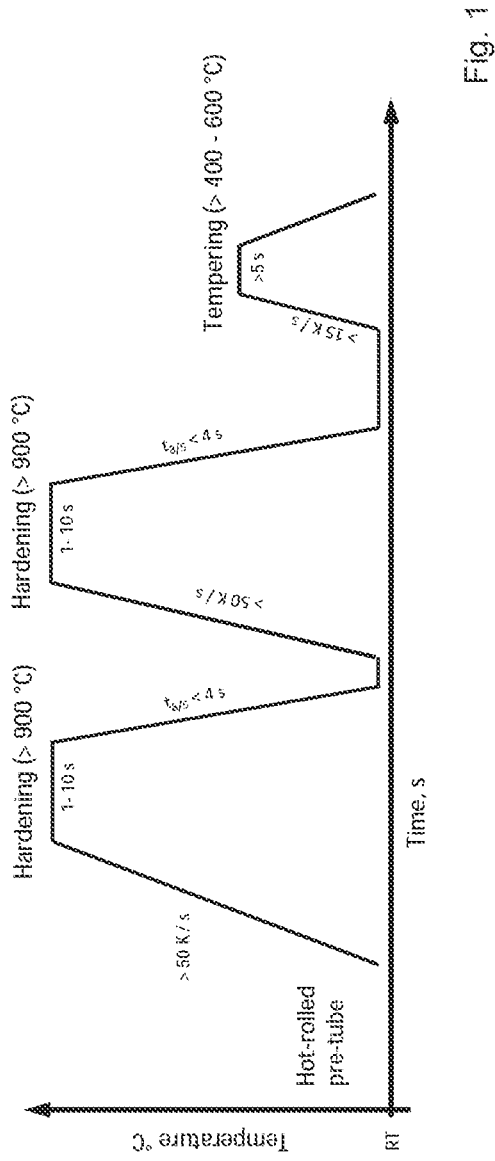
FIG. 1: time-temperature curve of an embodiment of a manufacturing process according to the invention.

FIG. 1 schematically shows the time-temperature curve of an embodiment of a manufacturing process according to the invention. As can be seen from FIG. 1, in a first hardening step, the hot rolled pre-tube is heated to a quenching temperature greater than 900° C. The heating is carried out at a heating rate greater than 50 Kelvin/second (K/s), for example greater than 70 K/s. The pre-tube is then held at the quenching temperature for a period of 1-10 seconds, for example 4-5 seconds. Thereafter, the pre-tube is quenched to a temperature below the Ms temperature at a cooling rate t8/5 of less than 4 Kelvin/seconds. This hardening step is then performed again. After the second hardening step, the pre-tube is heated to a tempering temperature above 400° C., in particular 400 to 500° C. The heating is carried out in particular at a heating rate of more than 15K/s. After a holding time of more than 5 seconds, the pre-tube is cooled.

Figure 2:
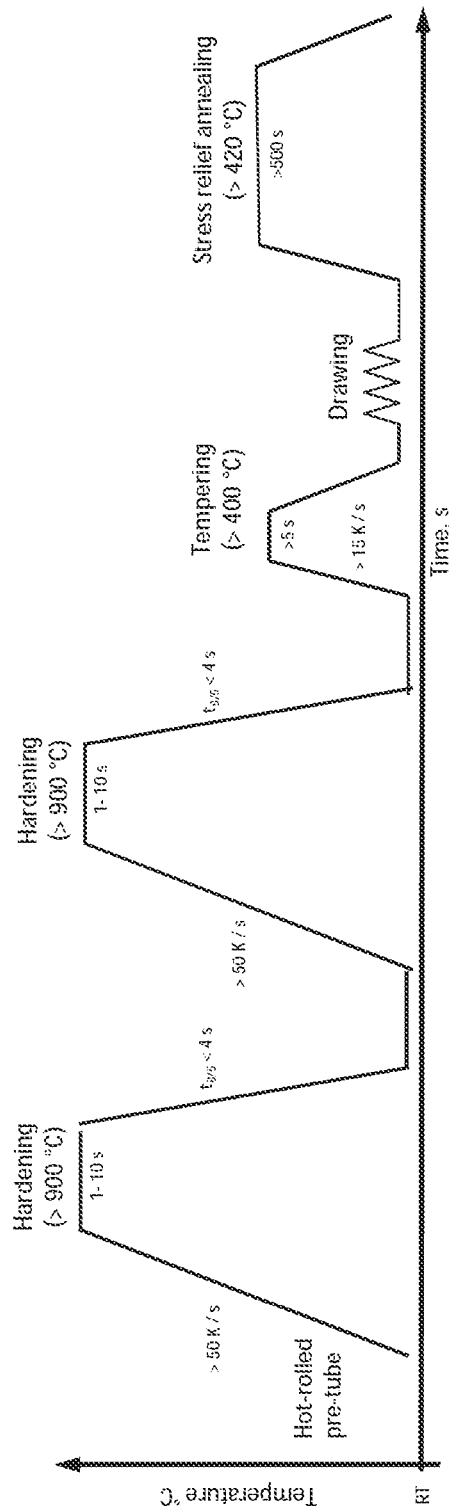
FIG. 2: time-temperature curve of a further embodiment of a manufacturing process according to the invention.

FIG. 2 schematically shows the time-temperature curve of a further embodiment of a manufacturing process according to the invention. In this embodiment, following the tempering step, the pre-tube is formed by drawing, in particular cold drawing, and then subjected to stress-relief annealing. The stress-relief annealing is carried out at a temperature of more than 420° C. and the pre-tube is preferably kept at this temperature for longer than 500 s.

Figure 3:
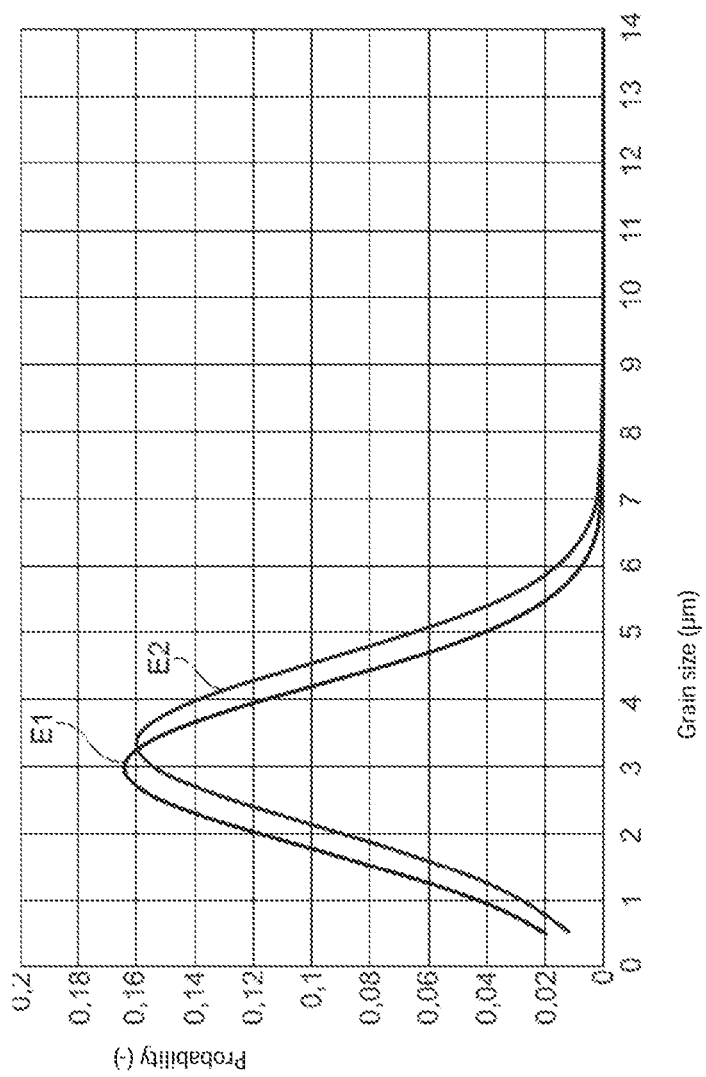
FIG. 3: a schematic representation of former austenitic grain size distribution of steel tube embodiments of the invention.

FIG. 3 shows a schematic diagram of the former austenitic grain size distribution according to a steel pipe according to embodiments of the invention (DQ&T). As can be seen from this diagram, the grain size according to the embodiments of the invention, which has been subjected to double hardening and tempering, is predominantly around 3.0 μm. The grain sizes were measured from longitudinal sections at a surface section of 27950 μm$^2$ of the steel tubes.

The measurements were carried out on hollows with an outer diameter of 30 mm and a wall thickness of 2.3 mm (30×2.3).

The process according to the invention is also advantageous compared to processes in which cold-drawn tubes are hardened (Final-QT) and processes in which a simply once quenched and tempered steel tube is cold-drawn and stress-relieved (QT+SR). Compared with the finished tubes produced by means of the final-QT process, the probability of the small former austenite grain size obtained according to the invention is higher. Compared to the finished tubes produced by means of the QT+SR process, the former austenite grain size of the tubes produced according to the invention is substantially smaller.

Figure 4:
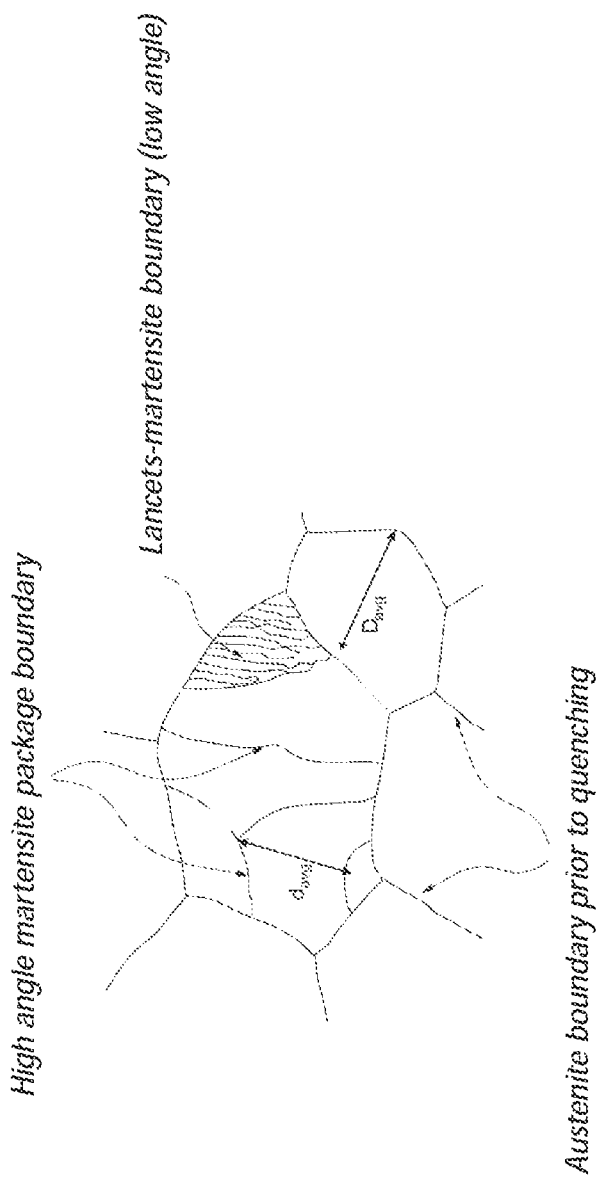
FIG. 4: schematic representation of a martensitic structure with former austenite grain boundaries and with martensitic package boundaries.

FIG. 4 schematically shows a martensitic microstructure. In particular, the former austenite grain sizes and the martensitic package boundaries are shown. The average martensite package size is denoted by $d_{avg}$ and the average former austenite grain size by $D_{avg}$.

The present invention thus relates to a method of double quenching and tempering (DQ&T) of high strength hot rolled steel tubes. Preferably, the heating to the quenching temperature is performed by induction heating. The present invention produces very fine-grained microstructures. In particular, the former austenite grain size is smaller compared to conventional steel tubes produced by means of hardening and tempering (Q&T). With the process according to the invention, a significant grain refinement is obtained with an average austenite grain size ($D_{avg}$) of 4.6 μm compared to QT tubes with $D_{avg}$ equal to 7.8 μm.

The grain refinement in quenched and tempered microstructure and the small martensitic package size leads to an increase in the yield strength of the materials according to the Hall-Petch relationship and also in the toughness of the material by increasing the breaking strength and stopping the crack propagation through the grain boundaries. These properties are also obtained in the process DQ&T according to the invention.

With the method according to the invention after cold drawing, $d_{avg}<3$ μm and $D_{avg}<5$ μm can be achieved.

The present invention has a number of advantages. In particular, high toughness (especially at low temperatures) can be achieved while maintaining high yield strength/strength. Thus, secure high-strength components, for example secure airbag tubes, and the products with quenched and tempered microstructure are created. In addition, fine-grained steels with the best surface qualities are created. The advantages can also be achieved on tubes with larger dimensions, for example AD>30 mm and WD>2 mm,

The invention claimed is:

1. A process for producing a high-strength steel tube, characterized in that a hot-rolled pre-tube made of a material having an Ac3 temperature at which the material of the pre-tube has been austenitized is subjected to at least two hardening steps with a final tempering step, the pre-tube is heated to a quenching temperature of at least the Ac3 temperature for hardening and is heated to a tempering temperature in a range of 400 to 600° C. for tempering, wherein the steel tube has a microstructure with a former average austenite grain size ($D_{avg}$) of <5 μm.

2. The process according to claim 1, wherein the steel tube has a martensitic structure and a tensile strength of at least 900 MPa.

3. The process according to claim 1, wherein the steel tube is made of an alloy comprising the following alloying elements in Ma-%, in addition to iron and impurities due to melting:
C 0.07-0.50
Si 0.01-0.60
Mn 0.3-1.7
Cr max. 1.2
Mo max. 1.2
Ni max. 0.4
Al 0.01-0.10
V max. 0.15
Nb max. 0.06
Ti max. 0.06.

4. The process according to claim 3, wherein manganese is present in an amount in a range of 0.5-1.7 Ma %.

5. The process according to claim 1, wherein the steel tube has a microstructure with an average martensitic parcel size of $d_{avg}$<3 μm.

6. The process according to claim 1, wherein the steel tube has a microstructure of stretched tempered martensite.

7. The process according to claim 1, wherein the steel tube has a wall thickness of less than 4 mm.

8. The process according to claim 1, wherein each hardening step comprises heating to a quenching temperature, holding at the quenching temperature, and quenching.

9. The process according to claim 8, wherein quenching to a temperature below a martensite starting temperature (Ms) occurs in each hardening step.

10. The process according to claim 1, wherein two hardening steps are performed followed by a single tempering step.

11. The process according to claim 1, wherein the pre-tube is heated to a temperature greater than Ac3 for hardening.

12. The process according to claim 1, wherein the pre-tube is drawn after the tempering step.

13. The process according to claim 12, wherein the pre-tube is subjected to stress relieving annealing after drawing.

14. The process according to claim 1, wherein the heating is by induction heating.

15. The process according to claim 1, wherein the quenching is at a t8/5 time of less than 4 s.

16. The process according to claim 1, wherein the pre-tube is maintained at the quenching temperature for a period of 1 to 10 seconds prior to quenching.

17. The process according to claim 1, wherein the pre-tube is maintained at the tempering temperature for a period of time greater than 5 seconds.

18. The process according to claim 1, wherein the pre-tube is heated to a temperature of Ac3+50° C. for hardening.

19. The process according to claim 14, wherein the induction heating is at a heating rate greater than 50K/s.

20. The process according to claim 1, wherein the steel tube has a tensile strength of at least 1,050 MPa.

21. The process according to claim 1, wherein manganese is present in an amount in a range of 0.6-1.7 Ma %.

22. The process according to claim 1, wherein the steel tube has a microstructure with a former average austenite grain size ($D_{avg}$) of <4.6 μm.

23. The process according to claim 1, wherein the steel tube has a microstructure with a former average austenite grain size ($D_{avg}$) of <4.0 μm.

24. The process according to claim 1, wherein the steel tube has a microstructure with a former average austenite grain size ($D_{avg}$) of <3.5 μm.

25. A process for producing a high-strength steel tube, characterized in that a hot-rolled pre-tube made of a material having an Ac3 temperature at which the material of the pre-tube has been austenitized is subjected to at least two hardening steps with a final tempering step, the pre-tube is heated to a quenching temperature of at least the Ac3 temperature for hardening and is heated to a tempering temperature in a the range of 400 to 600° C. for tempering, wherein the quenching is at a t8/5 time of less than 4 s.

26. The process according to claim 25, wherein the steel tube has a microstructure with a former average austenite grain size ($D_{avg}$) of <5 μm.

27. A process for producing a high-strength steel tube, characterized in that a hot-rolled pre-tube made of a material having an Ac3 temperature at which the material of the pre-tube has been austenitized is subjected to at least two hardening steps with a final tempering step, the pre-tube is heated to a quenching temperature of at least the Ac3 temperature for hardening and is heated to a tempering temperature in a the range of 400 to 600° C. for tempering, wherein the pre-tube is maintained at the quenching temperature for a period of 1 to 10 seconds prior to quenching.

* * * * *